Jan. 16, 1962
E. B. BLUE
3,016,573
DOUBLE ROTATION APPARATUS FOR MOLDING OF
HOLLOW ARTICLES FROM LIQUID
PLASTIC AND THE LIKE
Filed July 17, 1959
3 Sheets-Sheet 1
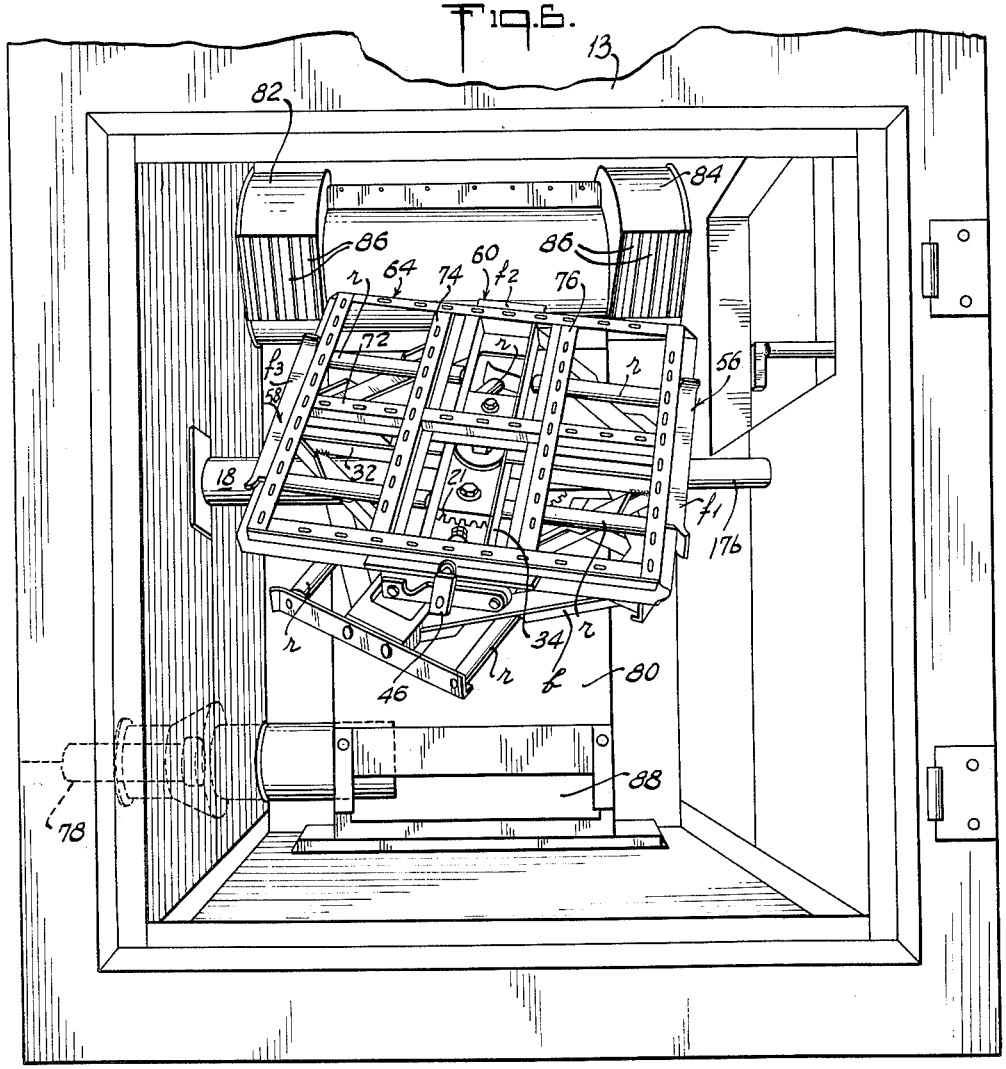
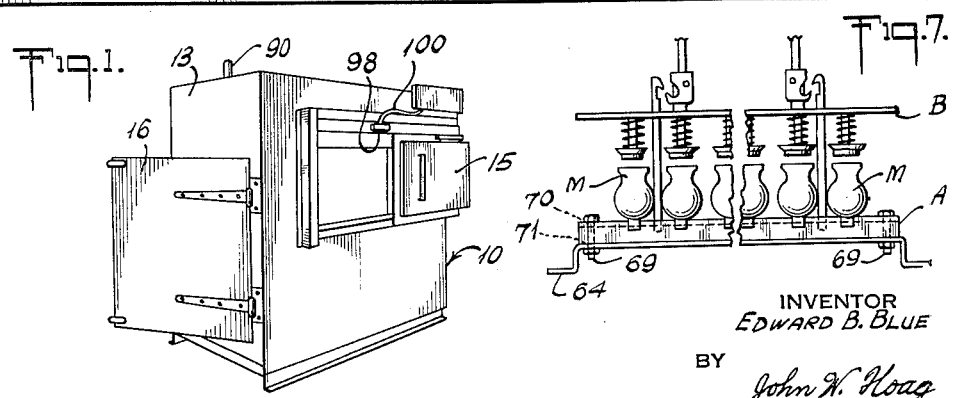
INVENTOR
EDWARD B. BLUE
BY
John W. Hoag
ATTORNEY

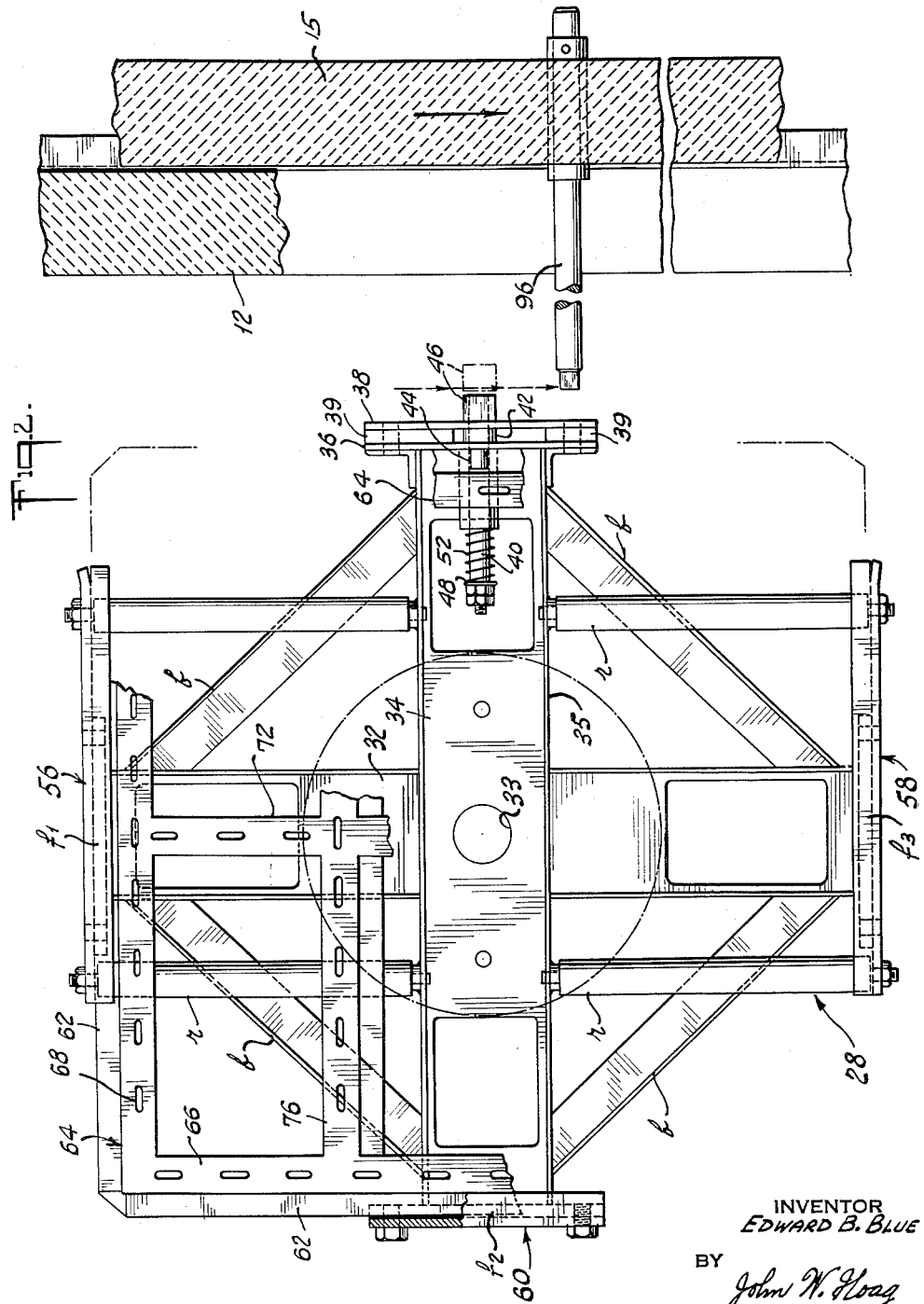

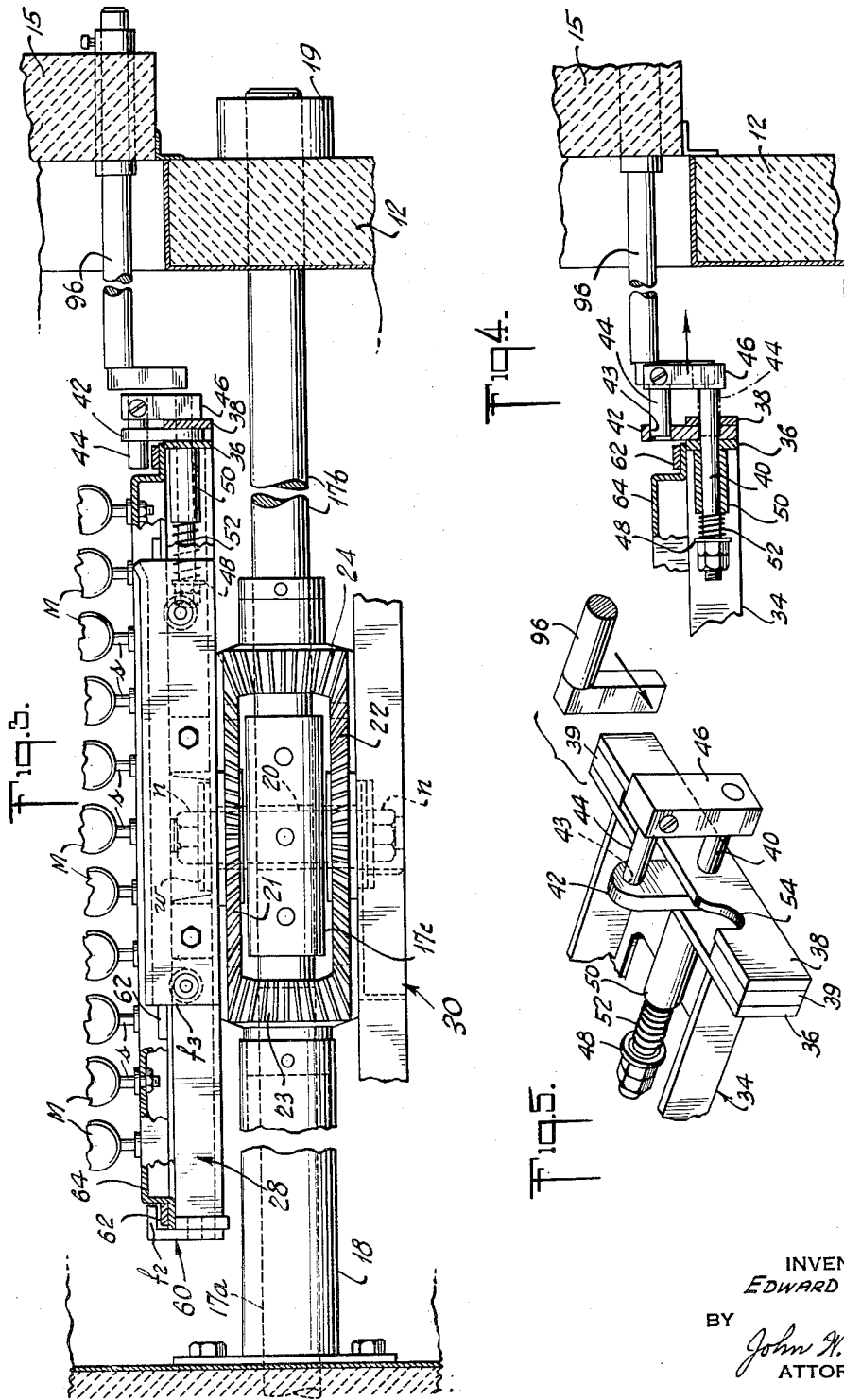

United States Patent Office 3,016,573
Patented Jan. 16, 1962

3,016,573
DOUBLE ROTATION APPARATUS FOR MOLDING OF HOLLOW ARTICLES FROM LIQUID PLASTIC AND THE LIKE
Edward B. Blue, 9 Kimberly Place, New Canaan, Conn.
Filed July 17, 1959, Ser. No. 827,823
3 Claims. (Cl. 18—26)

This invention relates to double rotation apparatus for molding of hollow articles from heat setting materials such for example as polyvinyl chloride. The apparatus described herein is for performing one or a series of batch operations.

An object of the invention is to provide simple, practical and efficient apparatus of the kind described.

Another object of the invention is to improve such apparatus by facilitating and increasing the free circulation of air to molds carried on carrier means mounted on carrier support means.

Another object of the invention is to provide such apparatus with improved control and safety means.

The invention will best be understood if the following description is read in connection with the drawings in which:

FIGURE 1 is a perspective view of an enclosure for housing the apparatus described herein.

FIGURE 2 is a plan view, partly broken away illustrating the structure of a mold carrier support, and indicating a mold carrier in "home" position thereon, and also indicating, partly in cross section, an opening in a wall of the housing for loading and unloading the carrier means, and means for closing and opening it including means carried thereon which co-acts with lock-and-stop means on a mold carrier, FIGURE 3 is a side elevational view of the rotation apparatus looking toward the rear of the enclosure, FIGURE 4 is a detail view of the lock-and-stop means of a carrier support, showing in full lines its unlocked position in which it acts as a stop preventing closing of a sliding panel, FIGURE 5 is a perspective view of the lock-and-stop assembly, FIGURE 6 is a front elevation, looking into the chamber or housing shown in FIGURE 1 through its open doorway, and FIGURE 7 is a perspective view of a two part multiple mold assembly provided with means for attachment to a mold carrier frame.

In the embodiment of the invention shown in the drawings the numeral 10 indicates generally a housing having side walls 12, and front and rear walls 13 and 14 (not shown) respectively, within which hollow articles are molded, by means to be described, from heat setting liquid plastic material, such, for example, as polyvinyl chloride.

In wall 12 of the housing a sliding panel 15 is provided in a position adjacent to the double rotation apparatus to be described. Through the space thus provided molds containing plastic to be molded may be loaded onto the double rotation apparatus and removed after the molding operation. Carriers are used on which one or more molds are attached so that it is actually the carriers, each supporting molds, which are loaded onto, and removed from, the double rotation apparatus.

A swinging door 16 supported on hinges is provided in the front wall 13 of the housing to give access to the interior of the housing, but in operation of the apparatus the loading and unloading of the mold carriers is done by hand through the space provided by sliding panel 15 in open position, and thereafter moving the panel to closed position to initiate a new batch molding operation.

A drive shaft 17 extends through wall 11 of housing 10 and is rotated by any suitable means such as an electric motor (not shown). Drive shaft 17 comprises a first part 17a which enters the housing through the sleeve 18, and a second part 17b which extends through a bearing 19 provided in wall 12. The shaft parts 17a and 17b are aligned with their inner ends spaced apart. Bridging the space between the shaft parts and interconnecting them is the collar means 17c. A cross support shaft 20 which is a double headed bolt, extends at a right angle to shaft 17, between the opposed ends of shaft parts 17a and 17b, and through the collar 17c to which it is secured in any suitable way as by welding.

A first pair of gears 21 and 22 are mounted for rotation on cross shaft 20 on opposite sides of shaft 17. On the inner end of stationary bearing sleeve 18 a bevel gear 23 is mounted. Gear 23 is stationary and with bevel gear 24, which is loosely mounted on shaft 17, forms a second pair of bevel gears which mesh with gears 21 and 22. When the drive shaft 17 and cross shaft 20 are revolving around the axis of the drive shaft the gears 21 and 22 are caused to travel on and around the stationary gear 23 and they are thus also rotated around the axis of cross shaft 20. If desired gears 22 and 24 may be eliminated and a counterbalancing disc used in place of gear 22 and keyed to the cross shaft 20.

The support members 28 and 30 are mounted on the outer surfaces of gears 21 and 22 (or on gear 21 and a counter-balancing disc used in place of gear 22), respectively and may be integral with said gears or fixed to them in any suitable way, as for example by welding. Accordingly, when shaft 17 is rotated the support members 28 and 30 are caused to rotate simultaneously around the axis of shaft 17 and the axis of cross shaft 20.

As shown in FIGURE 2 each of the support members 28 and 30 is an open frame member with the 2-sided angle members 56 and 58 defining parallel lateral edges of the frame, and the 2-sided angle member 60 defining its rear edge. Its front edge is defined by the cross pieces 36 and 38 which form part of a lock and stop assembly. Members 28 and 30 each comprise the crossed channel members 32 and 34, and the brace members b which are disposed between adjacent ends of the cross members.

Cross member 32 extends between the frame sides 56 and 58. Cross member 34 extends between the rear frame member 60, and the cross pieces 36 and 38 which are part of a front stop and lock assembly described hereafter. Flanges 35 extend upwardly from the lateral edges of cross member 34. Rollers r are mounted between flanges 35 and the side member vertical portions 56 and 58 to support and advance a mold carrier while it is being loaded on to, or removed from, a carrier support. A bore or hole 33 extends through the portions of 32 and 34 which cross one another, and the double ended bolt 20 projects through this aperture. Washers w are provided around the ends of member 20 on the outer surface of the support members respectively, and are held in place by the nuts n which are screwed onto the ends of cross shaft 20 respectively.

The angle members 56 and 58 respectively, are disposed with their flanges f–1 and f–3 respectively projecting over the support surface of member 28 or 30 and spaced above the support surface a distance slightly greater than the height of the edge of a mold carrier 64 and co-acting to provide guideways for a mold carrier while it is being loaded onto or unloaded from the carrier support 28, or the carrier support 30, and means for holding the carrier on the support while they are rotated. Member 60 serves as a stop against which an end of a mold carrier 64 abuts when it is in "home" position on the support, and its flange f–2 is disposed to extend over the rear edge of a mold carrier and coacts with the flanges f–1 and f–3 of members 56 and 58 and the locking means to be described, to retain a mold carrier on it while the support and the carrier thereon are both being rotated around two axes.

As shown in FIGURES 2 and 6, each mold carrier means 64 comprises a rectangular frame, the perimeter 66 of which is of a size to fit between the vertical portions of members 56 and 58 of the support members 28 or 30, and between the vertical portion of back stop 60 and the locking guide member 42 of the lock and stop assembly at the front end of cross member 34 (see FIGS. 2 and 5), and under the inwardly extending flanges f–1, f–2, and f–3 of the members 56, 58 and 60. Wear strips 62 are shown on top of the edges of the mold carriers.

The means for mounting molds on a carrier should permit speedy fastening and unfastening of the molds so that molds in which the plastic material has been "set" may be quickly detached from a carrier after the carrier has been removed from its support, so other molds containing material to be cast may be fastened on the carrier and the carrier returned to one of the support means 28 and 30.

As illustrated herein the horizontally extending perimeter of each mold carrier is perforated with a number of small apertures 68, the purpose of which is to receive the threaded stems s respectively, of molds, such for example as the molds M shown in FIGURE 3, or to receive bolts 69 adapted to be inserted through the hole 70, in the mounting flanges of the lower part A of a multiple mold assembly of the kind shown in FIGURE 7, and into aperture 68 with which the holes 70 are aligned. The stems s and the bolts 69 may be locked in the apertures 68 as by means of lock nuts.

In order that a single carrier may support a greater number of mold cross pieces such as 72, 74 and 76 may be provided each having a number of said openings or perforations 68. It will be understood that the molds employed may vary considerably in size and shape, and the perforations 68 are only illustrative of many possible means which can be used to engage and positively hold the molds on an air pervious carrier while they are subjected to double rotation.

Cross pieces 36 and 38 are spaced apart by the spacing blocks 39 leaving a space from within which there projects upwardly a locking guide member 42 which is mounted on the rotatable shaft 40 which extends through said cross pieces 36 and 38. In locking guide member 42 the hole 43 is provided to receive and act as a bearing for the locking finger 44 which projects rearwardly from the lock-and-stop member 46 which is mounted on the rotatable shaft 40 in front of cross piece 38. Around the rear end of rotatable shaft 40, between the flange 48 thereon and the rear end of a sleeve 50 which surrounds shaft 40 just to the rear of cross piece 36, is a spring 52 which tends to retract shaft 40 and therefore cause locking finger 44 to pass into and through the bearing 43 in locking guide member 42 when rod 40 has been rotated to bring member 46 into upright position. With member 46 in upright position and finger 44 extending through bearing 43 a fixed stop is provided on the front end of the mold carrier support which prevents the inadvertent dislodgement of a mold carrier from its support as will be more fully explained. However, when shaft 40 is pulled forwardly against the force of spring 52, thereby withdrawing finger 44 into the bearing 43, and, permitting members 44 and 46 and member 43 to be rotated counter clockwise through approximately 90°, the finger 44 will be received in the re-entry slot 54 in cross piece 38, with its free end abutting against the cross piece 36 and therefore positioning lock-and-stop member 46 further outwardly from cross piece 38 than is the case when finger 44 is inserted through the bearing 43 in the locking guide member 42. In this position of lock-and-stop member 46, which is shown in dotted lines in FIGURE 5, member 46 is positioned in the path of movement of a finger member 96, which is carried on the inner surface of the sliding panel 15, and prevents the panel 15 from being closed and thereby completing an electric circuit, not shown, for energizing the power means for actuating the drive shaft 17.

It will be noted that the mold carriers 64 and their supports 28 and 30 are air pervious and this is an important feature of the invention in addition to the coaction of the carriers and their supports.

In the operation of the device a heat transfer medium is supplied into housing 10 and caused to pass through the novel combination of a pervious mold carrier supported on a pervious mold carrier support. For this purpose streams of fluid or sprays of liquid may be employed. As illustrated herein air and gas are supplied into a burner 78 located outside of the housing 10 which communicates through the wall of the housing with an air header 80 which is more or less rectangular in form and disposed against the back wall of the housing. The heated air from the burner rises within the header, being drawn up by fans which are disposed in fan housings 82 and 84 at the top of the header and which are apertured to direct air from the fans across the path of the mold carriers and their supports as they are rotated within the housing. As shown, the fan housings are open in front and have the baffles 86 which are angled inwardly so that the air from the fans is directed downwardly and to the center of the housing 10. At the lower end of the header there is an air intake port 88 through which air which has passed downwardly through the mold carriers and their supports is sucked into the header 80 and recirculated. Since additional air is being continually introduced into the housing through the burner an air exhaust 90 is provided and is shown in FIGURE 1 as a port in the ceiling of housing 10.

It will be noted that the heated air circulating within the housing will thus be brought into contact with all the molds during all phases of their double rotation movement within the housing. Since the plastic molding material is supplied to the molds in liquid phase and is set by the heating of the mold walls due to contact with hot air within the housing, this is a substantial practical advantage over apparatus of the prior art in which the heated air came into contact with the molds only during a portion of their travel. Such contact was not over the whole mold surface and consequently produced uneven setting of the plastic. Since in the prior art either the mold carriers, or the supports for the mold carriers, or both, were impervious, heated air would strike only one surface of a mold when its carrier passed through the air stream and was then diverted and caused to flow around the mold carrier even while the carrier was passing through the upper portion of its path and thus interposed between the lower carrier and the exhaust of the hot air stream. The result produced inefficient and uneven heating of different portions of the molds with objectionable results on the objects being molded. With the apparatus disclosed herein the heated air flows freely through both the mold supports and the support carriers in all of their positions within the housing and so a more continuous, efficient and even heating of the entire surface of the molds is obtained, with corresponding improved results in the molded products.

Various well known devices may be employed for timing the duration of each casting operation to let the operator know when to open the sliding panel 15 and remove a mold carrier, or to cause the panel 15 to be moved automatically. In either event a contact finger 96 is mounted on the panel 15 in any suitable way, projecting inwardly in horizontal alignment with the unlocked position of the lock-and-stop member 46, for a distance such that during the course of the closing movement of panel 15 its free end will strike member 46 if it is in locked position, but will clear the lock-and-stop member if the latter is in its locking position and therefore disposed closer to the cross piece 38 than when it is not in locking position.

A limit switch 98 is shown on the housing (FIGURE

1), just above the sliding panel 15 in position to be contacted by a closing movement of the panel if the panel is not stopped by the lock-and-stop member 46 during its closing movement. Micro switch 98 is shown connected to the cable means 100 indicating an electric circuit which may desirably be connected to the power source for actuating the double rotation apparatus, when said switch 98 is closed, and causing it to drive shaft 17 of the double rotation apparatus.

The advantages of the means described for insuring that a mold carrier will not be thrown from its support means and destroyed, is obvious. This means has been found in practice to be thoroughly dependable.

There has thus been provided an improved apparatus of the kind described in which the above mentioned objects are achieved in a thoroughly practical manner.

What I claim is:

1. An air pervious support for supporting air pervious mold carrier members which comprises, first and second arms crossed substantially in the form of a maltese cross, third and fourth arms disposed at the respective ends of the second arm and extending parallel to one another and to said first arm and each supporting an angle member extending upwardly and inwardly over and above the support level of the support, and forming slideways, stop means at the rear end of said first arm, roller means forming part of the support surface of the support and disposed transversely between said first arm and the slideways at the ends of said second arm respectively to facilitate moving a mold carrier member onto and off said support, and means carried at the front end of said first arm and movable from a locking position, in which it extends above the support surface of the support and coacts with said slideways and said stop means to hold a mold carrier member on the support, to an unlocked position in which it is disposed out of the way of a mold carrier member which is being moved onto or off the support.

2. An air pervious support frame for a mold carrier comprising, spaced parallel side members, a first frame cross member spacing apart and interconnecting said side members, a second frame member which is a channel member extending over, and normal to, said first frame member, rollers extending between the sides of said channel member and said side members respectively, at the same level to provide a support surface, said side members comprising means extending upwardly and inwardly above the discontinuous support surface provided by said rollers, defining guideways adapted to receive the temperatures below about 95° C., the half-life, so to lateral edges of a mold carrier frame loaded on the support frame, stop means disposed at the rear end of the second frame member, and means disposed at the front end of the second frame member and operative to lock a mold carrier on the support frame when the carrier is engaged within said guideways and its rear end is in abutting relation to said stop means.

3. In apparatus for the double rotation of molds while heating them to set heat setting plastic material therein, the combination of, an air pervious mold carrier comprising a generally rectangular peripheral portion and one or more cross frame members extending between opposed sides of said peripheral portion, said peripheral portion and said cross members being apertured at spaced intervals to receive mold attachment means to dispose molds thereon projecting at right angles to the plane of the mold carrier, and flanges projecting outwardly laterally from the sides of said peripheral portion, and an air pervious support for the mold carrier comprising, a discontinuous support surface, a pair of side members disposed in parallel spaced relation and having means extending inwardly toward one another above the level of the support surface defining guideways, a stop disposed substantially in the plane of the guideways, lock means operative when a carrier is disposed on the support in abutting relation to said stop and with its flanges within said guideways, to prevent the carrier from sliding off the support means, and frame members interconnecting and spacing apart said angle members, said stop and said lock means.

References Cited in the file of this patent
UNITED STATES PATENTS

| | | |
|---|---|---|
| 2,254,262 | Bratring | Sept. 2, 1941 |
| 2,624,072 | Delacoste et al. | Jan. 6, 1953 |
| 2,838,797 | Kolar | June 17, 1958 |

OTHER REFERENCES

"More Bounce in Vinyl Balls," Modern Plastics, September 1954.

"Rotational Molding of Plasticols," Modern Plastics, September 1955.

UNITED STATES PATENT OFFICE
CERTIFICATE OF CORRECTION

Patent No. 3,016,573                              January 16, 1962

Edward B. Blue

It is hereby certified that error appears in the above numbered patent requiring correction and that the said Letters Patent should read as corrected below.

Column 3, line 34, for "mold" read -- molds --; column 4, line 71, for "locked" read -- unlocked --; column 6, line 4, strike out "temperatures below about 95° C., the half-life, s to".

Signed and sealed this 1st day of May 1962.

(SEAL)
Attest:

ERNEST W. SWIDER
Attesting Officer

DAVID L. LADD
Commissioner of Patents